(12) United States Patent
Kumar et al.

(10) Patent No.: US 7,024,627 B2
(45) Date of Patent: Apr. 4, 2006

(54) SYSTEM AND METHOD FOR PROVIDING A GRAPHICAL REPRESENTATION OF A FRAME INSIDE A CENTRAL OFFICE OF A TELECOMMUNICATIONS SYSTEM

(75) Inventors: Ashok Kumar, Tampa, FL (US); Girish Nair, Tampa, FL (US)

(73) Assignee: Verizon Corporate Services Group Inc., New York, NY (US)

( * ) Notice: Subject to any disclaimer, the term of this patent is extended or adjusted under 35 U.S.C. 154(b) by 585 days.

(21) Appl. No.: 09/772,759

(22) Filed: Jan. 30, 2001

(65) Prior Publication Data

US 2002/0060695 A1 May 23, 2002

Related U.S. Application Data

(60) Provisional application No. 60/219,194, filed on Jul. 19, 2000.

(51) Int. Cl.
*G06F 17/00* (2006.01)
*G06F 15/173* (2006.01)
*H04Q 7/20* (2006.01)

(52) U.S. Cl. ............... 715/733; 715/734; 715/735; 715/736; 709/223; 709/224; 455/67.7; 455/67.11; 455/423; 455/424

(58) Field of Classification Search ............... 345/733, 345/734–740, 760, 769, 771–773, 839, 730; 715/733–737; 709/223, 224; 703/23, 22, 703/13, 14; 455/423, 424, 67.7, 67.11
See application file for complete search history.

(56) References Cited

U.S. PATENT DOCUMENTS

| | | | | |
|---|---|---|---|---|
| 4,497,411 A * | 2/1985 | DeBortoli | ..................... | 211/26 |
| 5,500,934 A * | 3/1996 | Austin et al. | ................ | 715/853 |
| 5,553,083 A * | 9/1996 | Miller | ......................... | 714/748 |
| 5,606,664 A * | 2/1997 | Brown et al. | ................ | 709/224 |
| 5,788,087 A * | 8/1998 | Orlando | ....................... | 211/26 |
| 5,999,179 A * | 12/1999 | Kekic et al. | ................. | 715/734 |
| 6,112,015 A * | 8/2000 | Planas et al. | ................ | 345/735 |
| 6,154,465 A * | 11/2000 | Pickett | ....................... | 370/466 |
| 6,237,043 B1 * | 5/2001 | Brown et al. | ................ | 709/316 |
| 6,363,421 B1 * | 3/2002 | Barker et al. | ................ | 709/223 |
| 6,456,306 B1 * | 9/2002 | Chin et al. | ................... | 345/810 |
| 6,523,022 B1 * | 2/2003 | Hobbs | ........................... | 707/3 |
| 6,581,109 B1 * | 6/2003 | Fields et al. | ................. | 345/589 |
| 6,597,377 B1 * | 7/2003 | MacPhail | ..................... | 345/738 |
| 6,622,919 B1 * | 9/2003 | Wilz et al. | ............. | 235/472.01 |

* cited by examiner

*Primary Examiner*—Ba Huynh
*Assistant Examiner*—Truc T. Chuong
(74) *Attorney, Agent, or Firm*—Leonard C. Suchtya, Esq.; Joel Wall, Esq.

(57) ABSTRACT

A method is provided of presenting to a user a visual representation of a frame 275 resident at a central office 20 of a telecommunications system. The method includes the steps of: accessing a database including data as to a current condition of the frame; displaying, based on the accessed data, a graphical representation of the frame 275, the graphical representation including a visual indication of the current condition of the frame 275; and allowing a user to interface with the graphical representation to effect a mapping between the frame 275 and telecommunications lines leading to and from the frame 275.

51 Claims, 15 Drawing Sheets

FIG. 13

SYSTEM AND METHOD FOR PROVIDING A GRAPHICAL REPRESENTATION OF A FRAME INSIDE A CENTRAL OFFICE OF A TELECOMMUNICATIONS SYSTEM

This application claims benefit of U.S. Provisional Application No. 60/219,194, filed Jul. 19, 2000, which is hereby incorporated by reference.

BACKGROUND OF THE INVENTION

1. Field of the Invention

The present invention relates to systems and methods for mapping connections from a port on a switching card to a pin on a frame at a central office of a telecommunications system, or for mapping a pin on a frame to an outside plant feeder.

2. Related Art

To provide services to their customers, telecommunications companies (telcos) maintain a system of wire and fiberoptic land lines connecting their central offices (COs), at which switching cards are located, with their subscribers. This is true whether the service is telephone service, broadband Internet access, such as, for example, DSL or optical cable, or other broadband services, such as, for example, video-conferencing and land line delivery of television programming.

The path between a subscriber's address and a CO includes several stages, such as a drop connecting the address to a serving terminal; a distribution connecting the serving terminal to a cross-box; and a feeder connecting the cross-box with the CO. The feeder enters the CO by connecting to a pin on a frame, which is connected to a port on a switching card by a jumper, either directly or through one or more intermediate pins and jumpers. The frame itself is a physical structure located within the CO, laid out in a matrix of blocks, each of which includes a matrix of pins.

A pin in a frame is identified by a coordinate system based upon the physical location of the pin on the frame. However, due to the enormous number of frames, and the number of pins on each frame, the mapping of ports to pins on a frame and pins on the frame to feeders has up to now been a relatively complex undertaking, one that must be performed by specially trained personnel, assisted by specialized software running on a mainframe computer. Moreover, because such existing computer systems are text-based, they do not offer the user the ability to readily visualize the frame in relation to the incoming and outgoing lines, and are therefore not optimal for the mapping functions to which they are directed.

Thus, the need exists for a system that allows a user to visualize the frame and lines connected thereto more easily, thus making mapping easier. There also is a need for a system that can access a database of a telco's resources to assist in controlling the growth and maintenance of frames in CO's.

SUMMARY OF THE INVENTION

In consideration of the above, to facilitate mapping from a port on a switching card to a pin on a frame at the central office, or mapping from a pin on a frame to an outside plant feeder, there is provided a graphical user interface running on a client computer or workstation that is operable to contact and communicate with a server that can access a database containing data relating to the resources of a telecommunications system. With the data, the graphical user interface of the present invention can present a graphical representation of frames, down to the pin levels, residing in the various central offices of the telecommunications system and allow for examination and modification of such frames.

In accordance with one aspect of the present invention, there is provided a method of presenting to a user a visual representation of a frame resident at a central office of a telecommunications system. The method comprises: accessing a database including data as to a current condition of the frame; displaying, based on the accessed data, a graphical representation of the frame, the graphical representation including a visual indication of the current condition of the frame; and allowing a user to interface with the graphical representation to effect a mapping between the frame and telecommunications lines leading to and from the frame.

BRIEF DESCRIPTION OF THE DRAWINGS

FIG. 13 shows a frame map window, which allows a graphical representation of a specified frame to be viewed, in accordance with a preferred embodiment of the present invention;

DETAILED DESCRIPTION OF THE PREFERRED EMBODIMENTS

Figure 1:
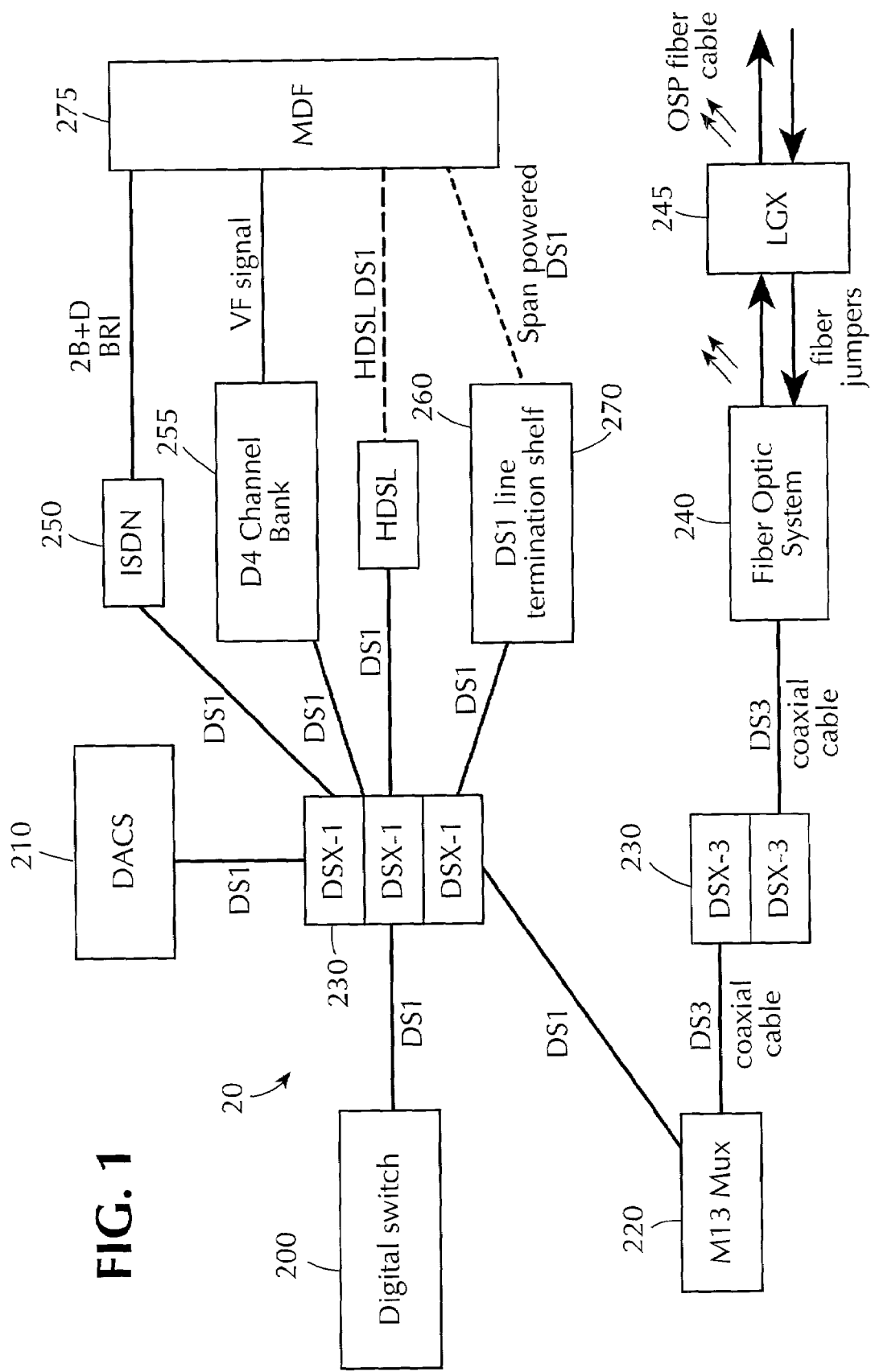
FIG. 1 shows an exemplary central office (CO) layout for a telco.

FIG. 1 illustrates an exemplary central office (CO) layout for a telephone company (telco). The figure shows the various types of equipment that may reside in, or interface with, a CO. Not every CO will have, or interface with, every type of equipment shown in the figure.

In the illustrated CO, digital switch 200 is connected by a DS1 data voice channel to digital signal cross-connect (DSX-1) 230, as is digital access and cross connects (DACS) 210. An M13 Mux is connected to the digital signal cross-connect 230, by DS1, and to the digital signal cross-connect (DSX-3) 235, by DS3 data voice channel (coaxial cable). Another DS3 cable connects the digital signal cross-connect (DSX-3) 235 to fiber optic system 240 and the fiber optic system is in turn connected by fiber jumpers to light guide cross connect (LGX) 245. Connections from that point are by OSP fiber cable.

Digital signal cross-connect (DSX-1) 230 connects by DS1 to integrated services digital network (ISDN) 250, which is in turn connected, by 2B+D basic rate interface (BRI) to the main distribution frame (MDF) 275. Digital signal cross-connect (DSX-1) 230 also connects by DS1 to a fourth generation channel bank (D4 channel bank) 255, which is in turn connected, by VF signal, with the MDF 275. Digital signal cross-connect (DSX-1) 230 also is connected to very high speed digital subscriber loop 260, which is in turn connected, by HDSL DS1, to the MDF 275. Digital signal cross-connect (DSX-1) 230 also connects, by DS1 to DS1 line termination shelf 270, which is in turn connected, by span powered DS1, to the MDF 275.

Figure 2:
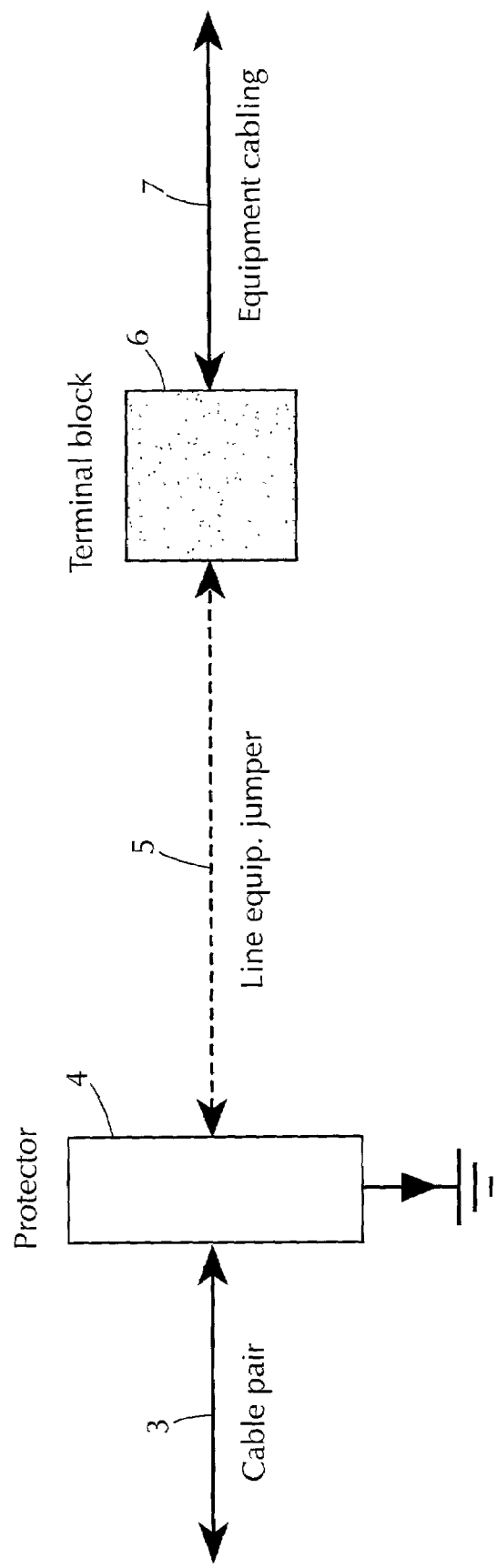
FIG. 2 shows the protector and terminal block in relation to the cable pair, the line equipment jumper and the equipment cabling.

An MDF in a typical CO provides pair protection by including protectors, which terminate the outside plant pair and provide lightning protection to the pair, and blocks, which terminate the lines from the equipment and are wired out to a cross connect cabinet. FIG. 2 illustrates the protector 4 and terminal block 6 of a typical MDF, in relation to the cable pair 3, the line equipment jumper 5 and the equipment cabling 7.

The organization and layout of telecommunication frames is rather complex, in no small part because of the number of pins on each of a very large number of frames. To bring some order to this complexity, a set of identifying conventions have been developed. These conventions allow a person to identify a particular frame at a particular location, as well as a particular portion of that frame. At the highest level, each frame may be referred to by identifying its physical location, e.g., at which CO it resides. Since there may be more than one frame at any given location, each frame is further identified by a number.

In addition to location and number, frames are differentiated by type. Specifically, a frame may be classified as being either a main distribution frame (MDF) or a tie frame (TIE). An MDF connects lines coming from outside or going to outside of the CO, while a TIE frame provides jumpers internal to the CO. An MDF may be either single sided or double sided. A TIE frame is always single sided.

A single sided frame, whether an MDF or a TIE frame, is organized by sub-components known as modules. Each module contains hardware known as shelves; each shelf contains hardware referred to as blocks. The modules, shelves and blocks are usually identified by numbers. A combination of these numbers, known as a "triple" (module number, shelf number and block number) uniquely identifies any particular block on a frame and acts as the block's frame coordinates.

A double sided frame has two sides. One side is called the "horizontal" side. The other side is called the "vertical" side. Each side of a double sided frame is divided into constituent blocks. A block, on either the horizontal side or the vertical side of the double sided frame, is identified by its vertical coordinate and its horizontal coordinate. The terms vertical and horizontal in this context should not be confused with the use of those terms in the context of vertical and horizontal sides.

A block on a double sided frame can be uniquely identified by its "triple" (side, vertical, horizontal). This triple functions as a block's frame coordinates. By convention, verticals are identified by a number and horizontals by an alpha character.

A frame break table defines the position and characteristics of each break in the frame, a break being a physical gap between two modules (verticals) of a frame. A frame may have zero or more frame breaks.

Figure 3:
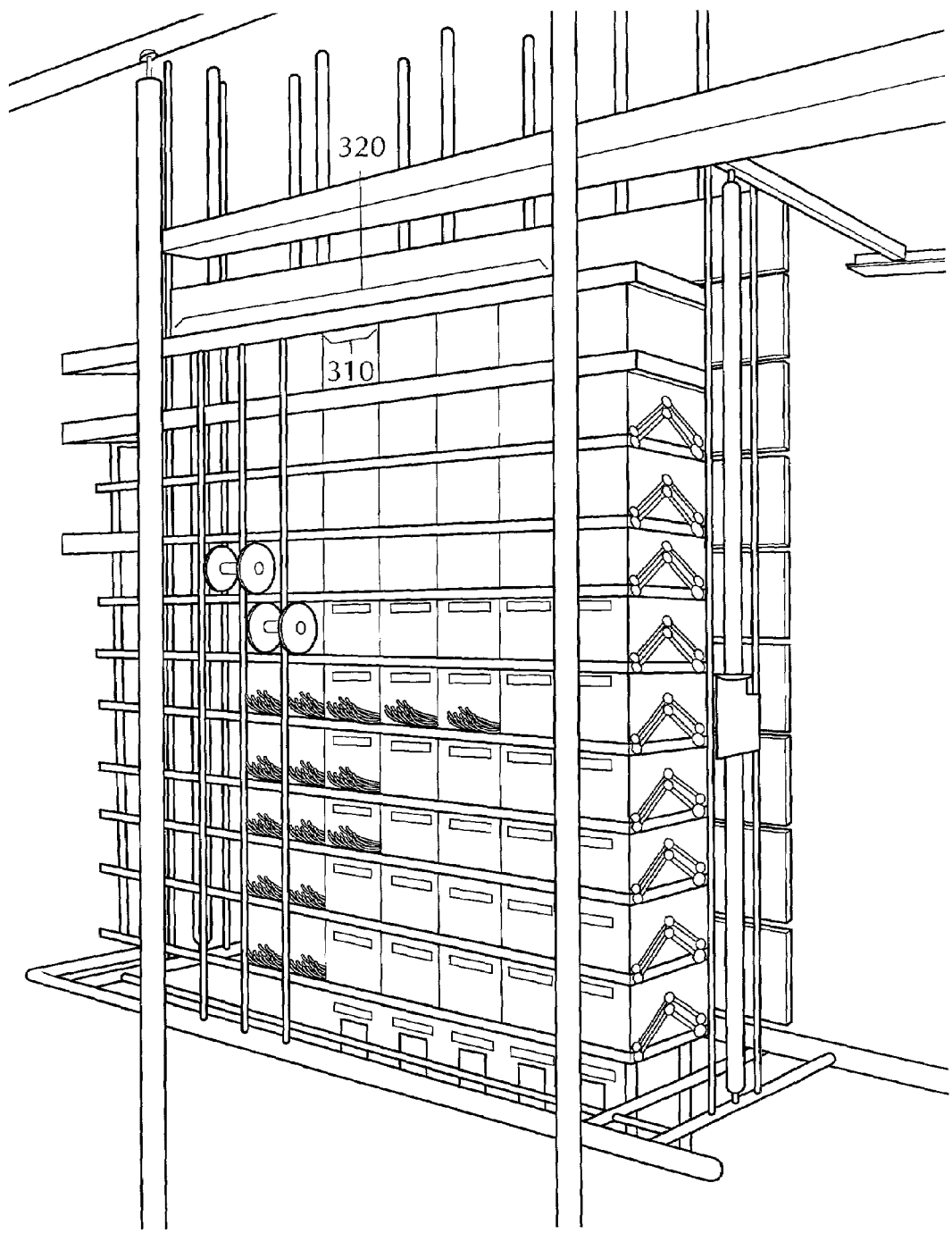
FIG. 3 shows a main distribution frame (MDF), which provides pair protection and has a 2 sided frame horizontal having line blocks and a vertical side having cable protectors.
Figure 4:
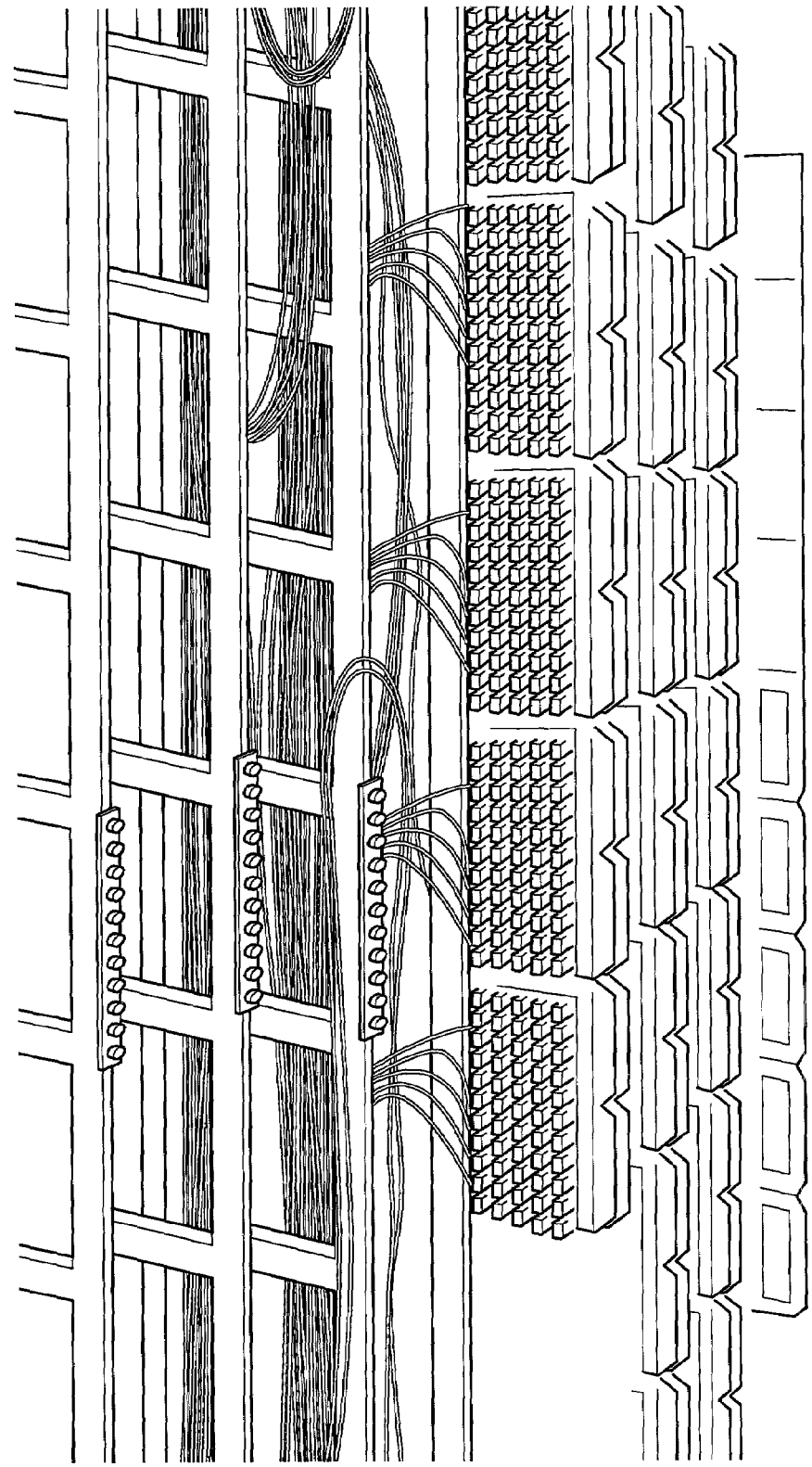
FIG. 4 shows a main distribution frame vertical side, having protectors for the termination of cable pairs.

FIG. 3 shows an exemplary main distribution frame (MDF), which provides pair protection and has a two sided frame horizontal side having line blocks and a vertical side having cable protectors. In particular, the figure shows a single sided frame. Reference numeral 300 indicates a shelf. Other shelves are situated above and below the referenced shelf 300. Reference numeral 310 indicates an example of a block, with other blocks situated to the left and right of the referenced block 310. An example of a module is indicated by reference numeral 320. Note that the module has several blocks. FIG. 4 shows a main distribution frame vertical side, showing the protectors for the termination of cable pairs in greater detail.

Figure 5:
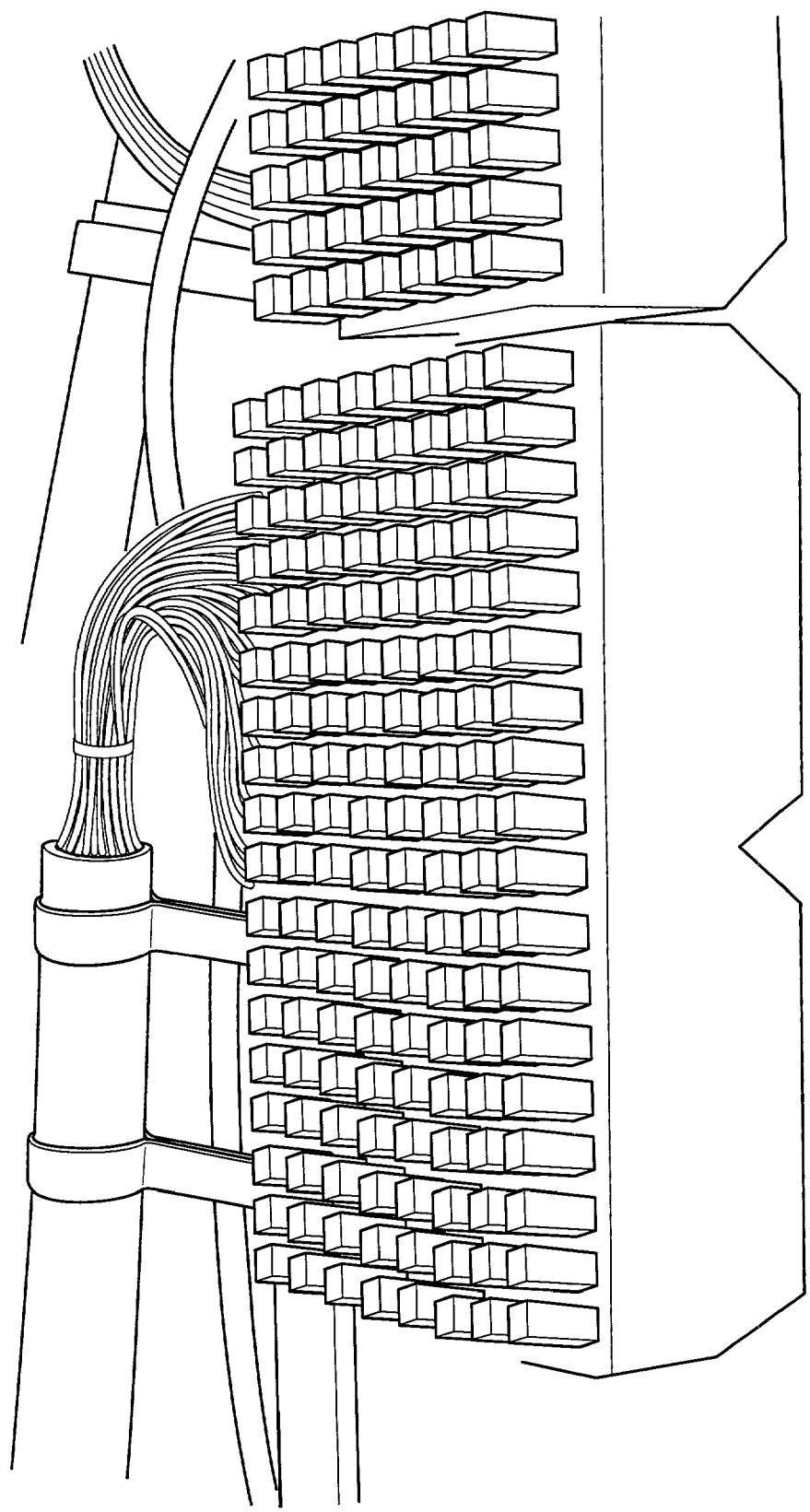
FIG. 5 shows a main distribution frame cable pair protector, which provides a hundred pair termination of cable pairs and lightning protection.
Figure 6:
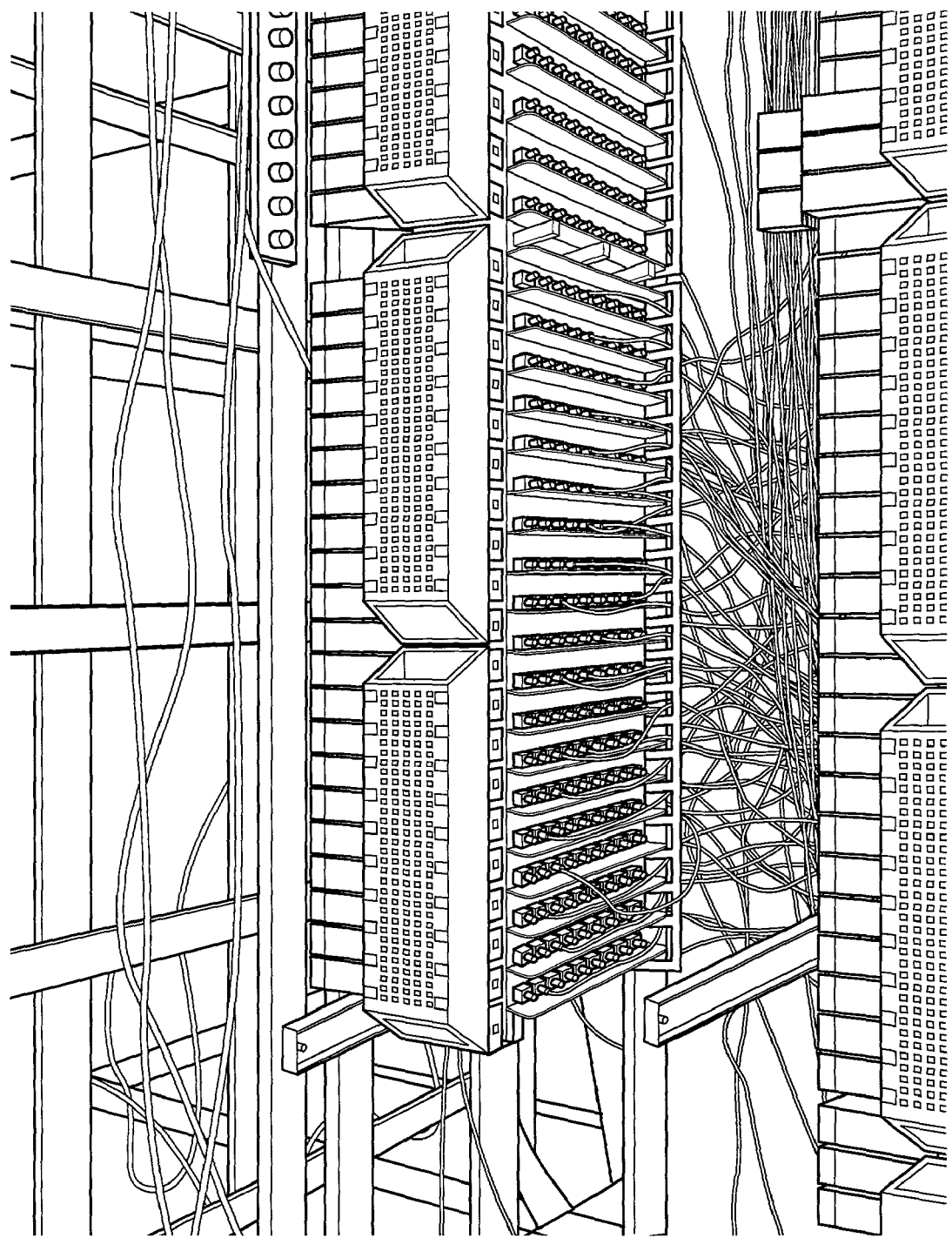
FIG. 6 shows a main distribution frame cable pair protector, showing jumpers to the line circuit of the telephone switch.
Figure 7:
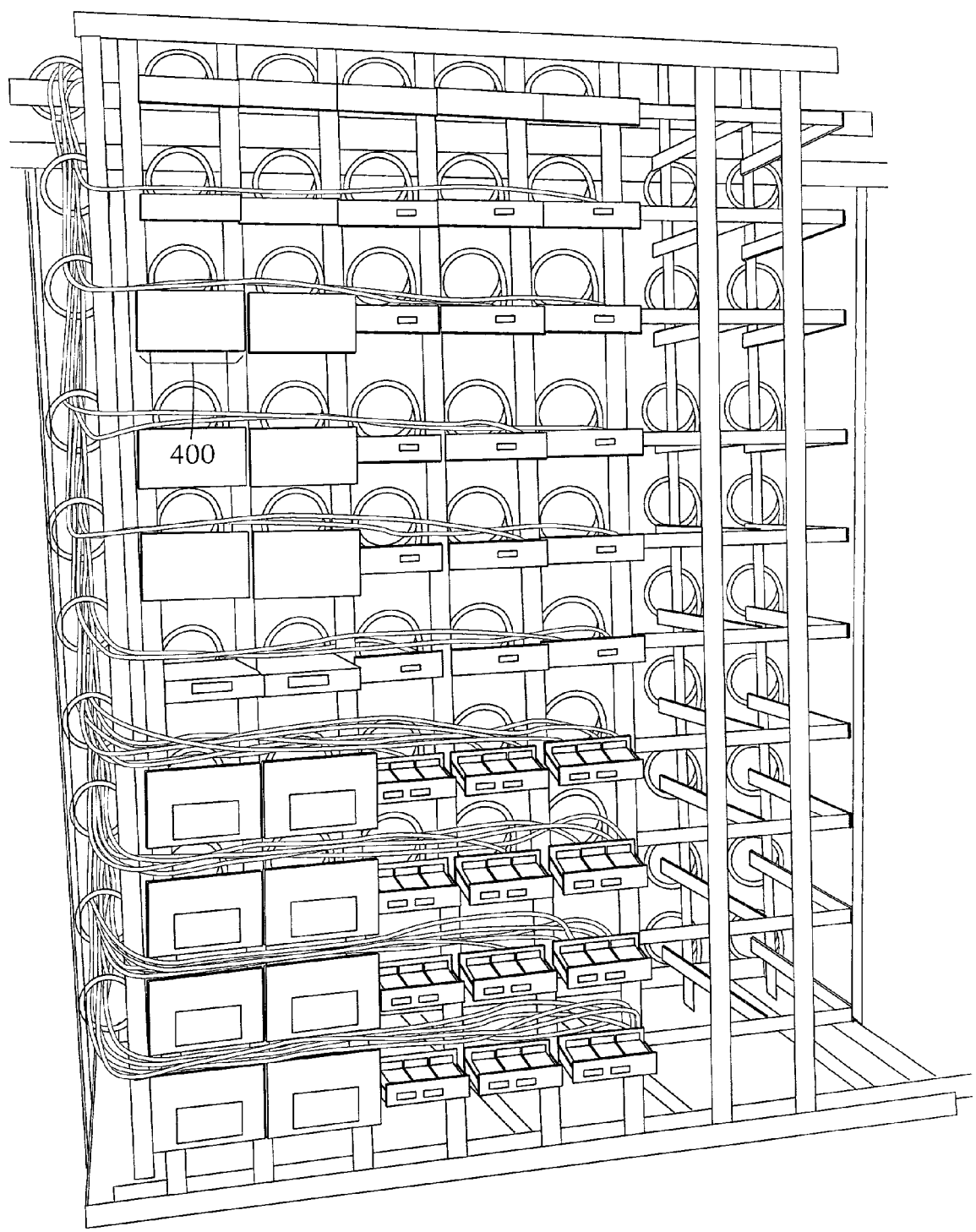
FIG. 7 shows a main distribution frame horizontal side, having blocks for termination of line circuits.
Figure 8:
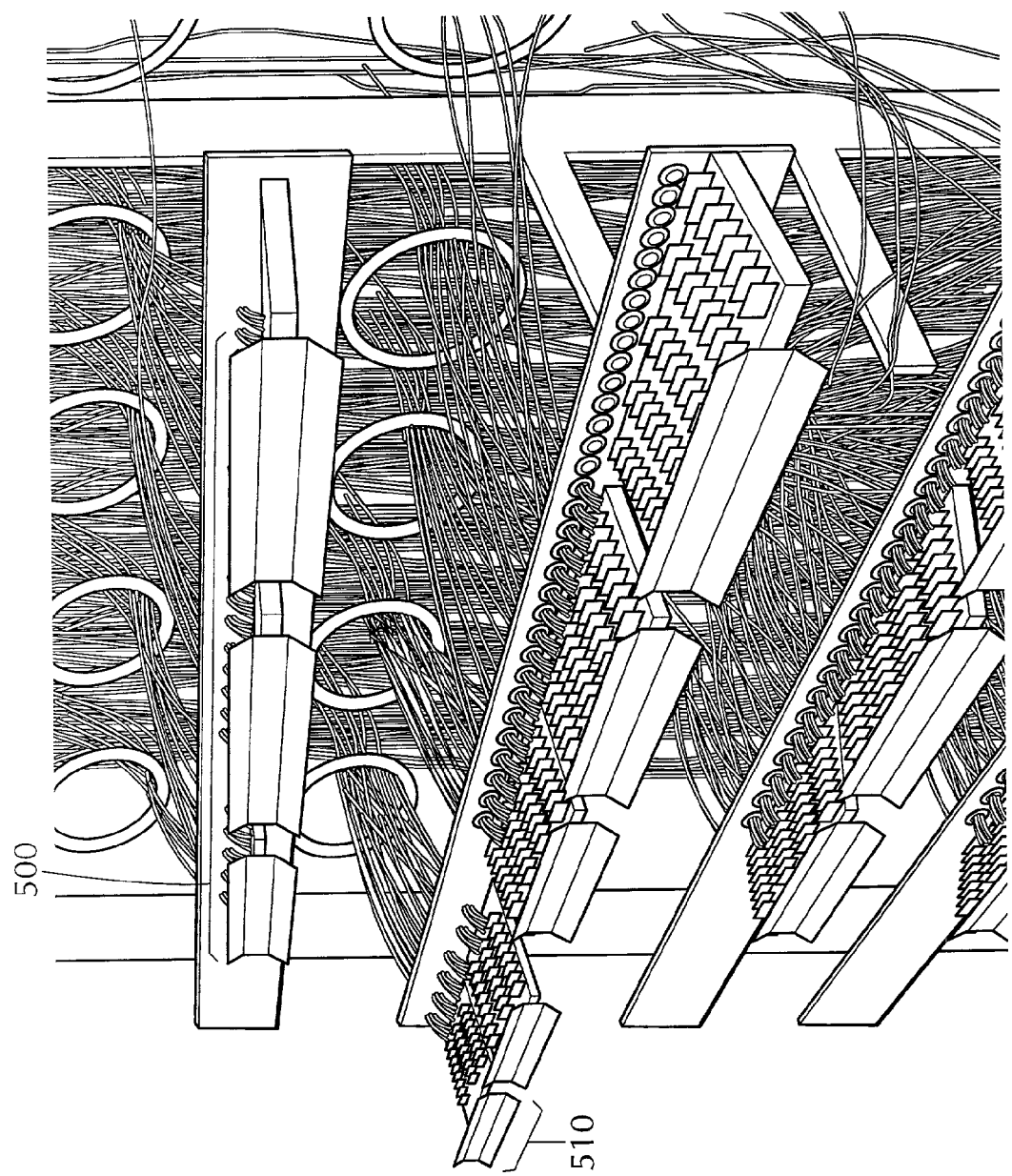
FIG. 8 shows blocks on a main distribution frame.

FIG. 5 shows a main distribution frame cable pair protector, which provides a hundred pair termination of cable pairs and lightning protection. FIG. 6 shows a main distribution frame cable pair protector, showing jumpers to the line circuit of the telephone switch. In particular, the figure shows a double sided frame vertical side. FIG. 7 shows a main frame horizontal side, having blocks, such as the one indicated by reference numeral 400, for termination of line circuits. FIG. 8 shows blocks on an MDF. In particular, the figure shows a double sided frame horizontal side. An exemplary shelf is indicated by reference numeral 500. An exemplary block is indicated by reference numeral 510.

According to a preferred embodiment of the present invention, a graphical user interface (GUI) is provided to allow a user to map connections from a port on a switching card inside a CO to a pin on a frame, and to map a pin on a frame to an outside plant feeder. The software generating the GUI provides this functionality by presenting the user with a series of windows, including a graphical representation of any given frame within the telecommunications system. In accordance with one preferred embodiment of the present invention, accessing a given block of the frame, by clicking-on the graphical representation of that block, displays, among other things, information regarding how many pins are contained in the block, how many are in use and how many are available. A user may map ports to pins, pins to other pins, or pins to feeders by accessing a visual representation of a block and indicating, by interaction with the graphical user interface, that he wishes to map a port or feeder to it. The software will select the specific pin automatically, if one is available, by referencing a database of telco assets.

The graphical user interface that is used to implement this visualization is formed by software running on a user's computer or workstation. The software is operable to access a database of information as to the assets of the telco, including current information as to the current usage and availability of pins of each frame in every CO.

The software is preferably implemented to run as a browser on a client computer in a system having a client/server architecture. In such a system, the server runs on a site on a network, such as a site on the World Wide Web. The client browser is operable to request information from the server site. Preferably, the server has access, e.g., via well-known Common Gateway Interface (CGI) techniques, to a database of the hardware assets of the telco. The client/server architecture advantageously allows many different users to run the GUI software to access the server and the database simultaneously.

As will be shown, the GUI of the present invention presents the frame data in an easy to visualize format, making it simple for a user to keep track of frame pin assignments and oversee the growth of the frame.

Figure 9:
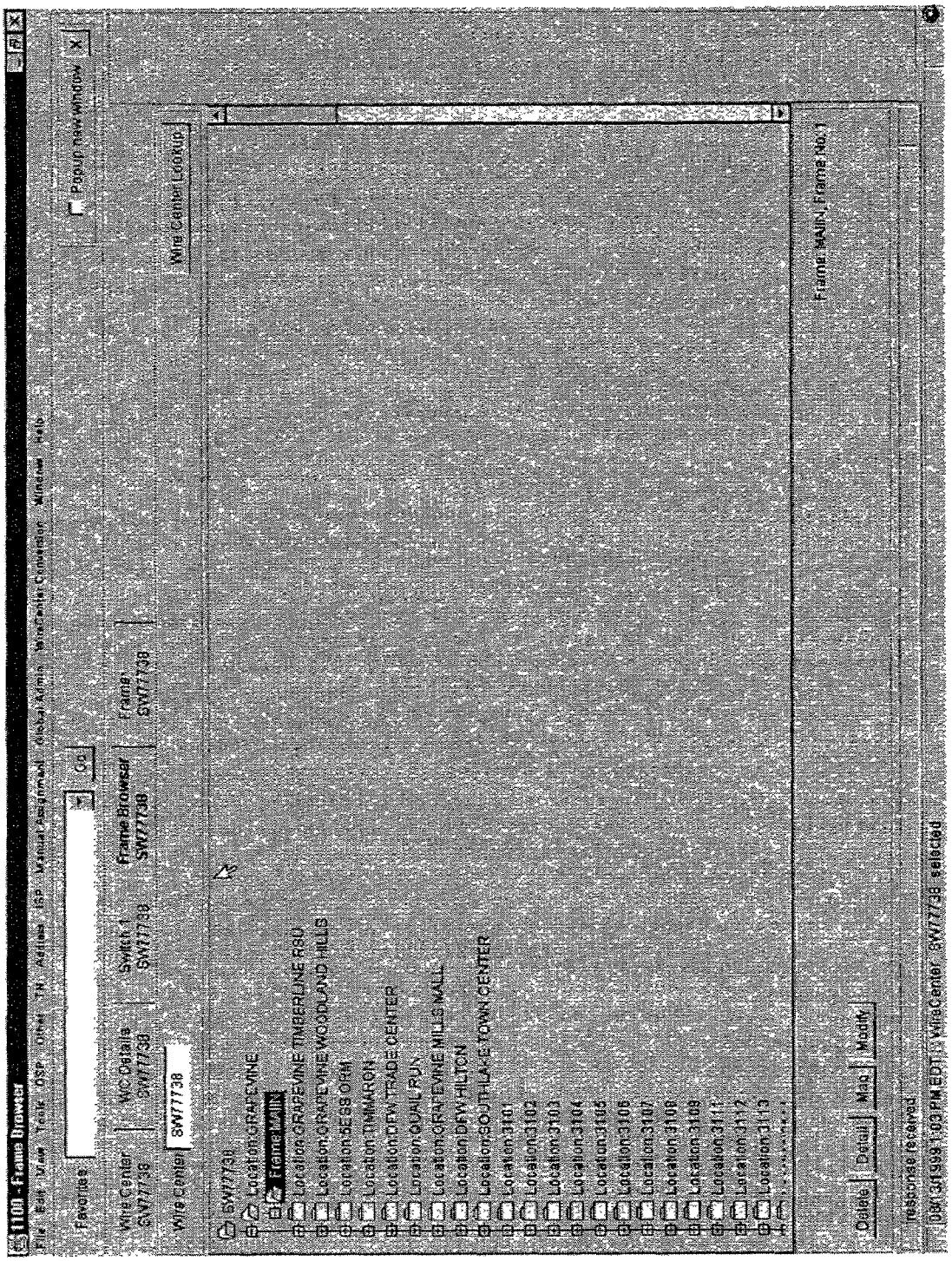
FIG. 9 shows a frame browser window in accordance with a preferred embodiment of the present invention.

FIG. 9 shows an exemplary frame browser window in accordance with a preferred embodiment of the present invention. The frame browser window lets the user view a list of wire center locations (i.e., CO's) and the frames associated with each. Clicking on the wire center folder lets the user see the location list. Clicking on a location lets the user see any frames that are at the location. For example, in the figure, the locations for wire center SW77738 are listed and the folder for location GRAPEVINE has been opened to show frame MAIN. Highlighting a frame in the list changes the function buttons displayed in the window. Function buttons let the user access other windows that can be used to perform frame administration tasks.

The frame browser having the GUI of the present invention preferably is included as a menu option in a larger on-line transaction processing system of the telco, but may run as a standalone program on a client with access to a network server as described above, without departing from the spirit of the present invention.

Tables 1A and 1B list and describe the available fields and functions in the frame browser:

TABLE 1A

| Field | Description |
| --- | --- |
| Wire Center | The name or ID of the central office. |

TABLE 1B

| Function | Description |
| --- | --- |
| Wire Center Lookup | Displays the Wire Center window to search for a wire center by name, code, or number. |
| Delete | Deletes the selected row from the list box. |
| Detail | Opens the Frame Detail window. |
| Map | Opens the Frame Map window. |
| Modify | Displays message, Open the Map to modify Frame. |

The field wire center is for entry of the name or identification of the CO.

The function button wire center lookup displays the wire center window to allow the user to search for a wire center by name, code or number. Function button delete deletes the selected row from the list box. Function button detail opens the frame detail window, function button map opens a frame map window, and function button modify displays the message "open the map to modify frame".

Figure 10:
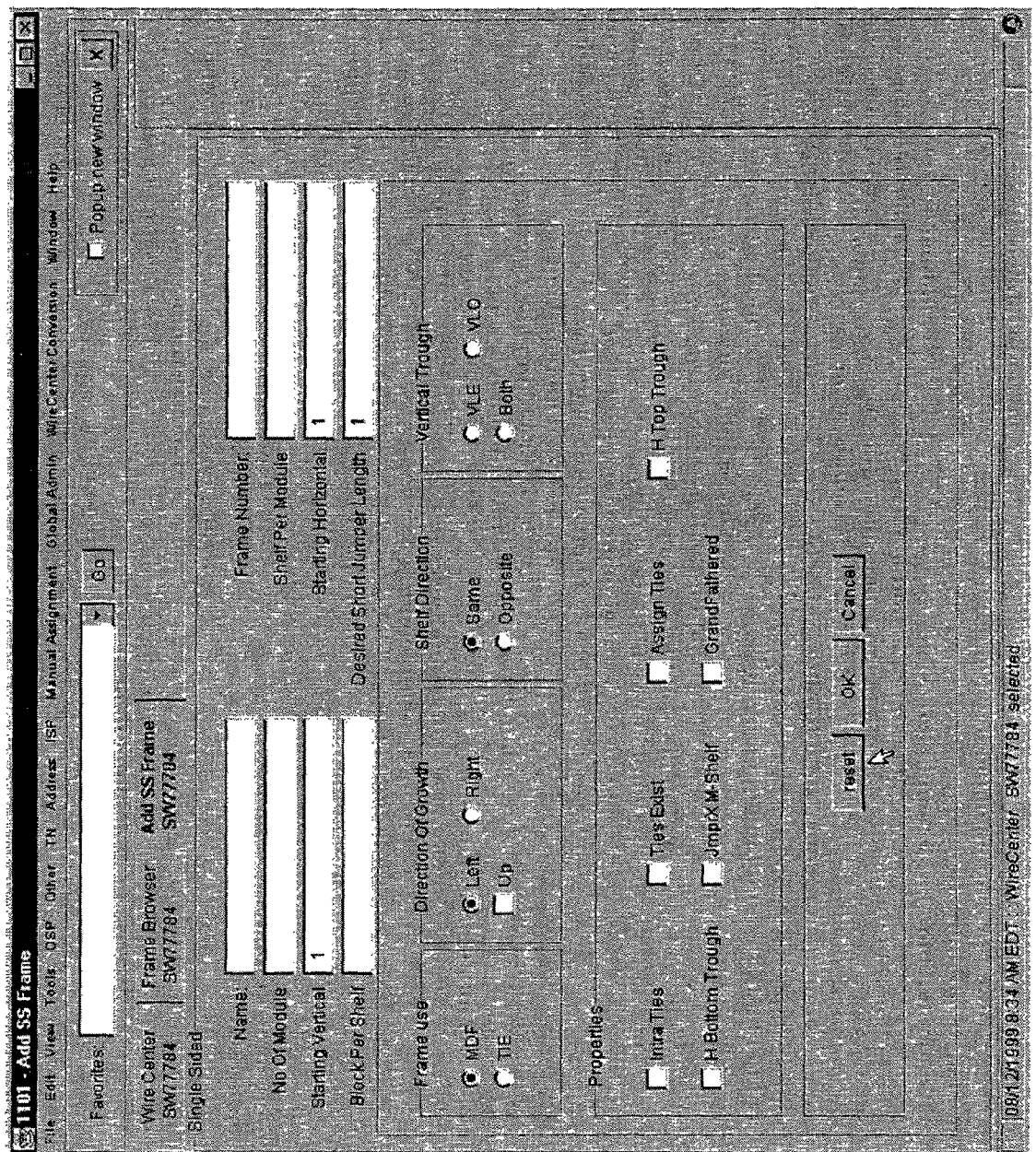
FIG. 10 shows an add single-sided (SS) frame window of the frame browser, in accordance with a preferred embodiment of the present invention.

FIG. 10 shows an exemplary add single-sided (SS) frame window of the frame browser of the present invention. As shown in the figure, the add SS frame window allows the user to add a single-sided frame to the selected wire center location. The user can set the number of modules, shelves, and blocks per shelf. The user also can define the direction of growth, shelf direction, primary use, a vertical trough and frame properties.

Tables 2 and 3 describe the fields and functions available in add SS frame:

TABLE 2

| Field | Description |
| --- | --- |
| Name | The descriptive name of the selected frame (e.g., Jackson Spring RSU). |
| Frame Number | The number assigned to the frame. |
| No of Module | The number of modules on the frame |
| Shelf Per Module | The number of shelves in the modules. There can be a maximum of 31 shelves in a module. |
| Starting Vertical | The number identifying the first vertical in the frame. |
| Starting Horizontal | The number identifying the first horizontal in the frame. |
| Block Per Shelf | The maximum number of blocks allowed on a shelf on a single-sided frame. |
| Desired Short Jumper Length | The number of frame verticals that can be spanned by a jumper connecting the outside plant facilities to the LNI. |
| Frame Use | |
| MDF | Indicates whether the specified frame is a main distribution frame (MDF). |
| TIE | The primary use of the frame is as a tie frame, as opposed to a main distribution frame. |
| Direction of Growth | |
| Left | Indicates the direction of growth for a frame. If selected, frame growth will be to the left. |
| Right | Indicates the direction of growth for a frame. If selected, frame growth will be to the right. |
| Up | Indicates the direction of growth for the frame is upward. |
| Shelf Direction | |
| Same | Indicates that new shelves are added to the frame in the same direction as the frame growth. |
| Opposite | Indicates going in the other (opposite) shelf direction. |
| Vertical Trough | |
| VLE | (Vertical Left Even)Indicates the vertical trough is on the left side of the even number verticals. |
| VLO | (Vertical Left Odd)Indicates the vertical trough is on the left side of the odd number verticals. |
| Both | Indicates that a trough used as a pathway for jumper wires is present on both the left and right sides of the vertical. |
| Properties | |
| Intra Ties | Indicates whether cable ties are allowed within the same frame. |
| Ties Exist | Indicates that there are tie cables on the specified frame. |
| Assign Ties | Indicates that tie cable pairs need to be automatically assigned to the frame. |
| H Top Trough | Indicates whether the frame has a top horizontal trough used as a pathway for jumper wires. |
| H Bottom Trough | Indicates whether the frame has a bottom horizontal trough used as a pathway for jumper wires. |
| JmprX M-Shelf | Indicates whether jumpers cross in the middle of the module. |
| Grandfathered | Indicates whether no frame assignments are permitted. |

TABLE 3

| Function | Description |
| --- | --- |
| Reset | Restores fields to their default values. |
| OK | Executes a specific task (e.g., add or modify data, initiate a search), closes the window, and returns you to the previous window. |
| Cancel | Closes the window without saving data. |

The name field is for the descriptive name of the selected frame (e.g., Jackson Spring RSU). The frame number field relates to the number assigned to the frame. The no of module field identifies the number of modules on the frame. The shelf per module field shows the number of shelves in the modules. There can be a maximum of 31 shelves in a module. The starting vertical field refers to the number identifying the first vertical in the frame. The starting horizontal field refers to the number identifying the first horizontal in the frame. The block per shelf field shows the maximum number of blocks allowed on a shelf on a single-sided frame. The desired short jumper length field shows the number of frame verticals that can be spanned by a jumper connecting the outside plant facilities to the LN1.

Frame use fields include MDF, which, if selected, indicates that the specified frame is a main distribution frame (MDF), and TIE, which, if selected, indicates that the primary use of the frame is as a tie frame, as opposed to a main distribution frame.

Direction of growth fields include left, right and up, which indicate the direction of growth for the frame. If left is selected, the direction of frame growth will be to the left, if right is selected the direction of frame growth will be to the right, and if up is selected, the direction of frame growth will be upward.

Shelf direction fields are designated same and opposite. If selected, same indicates that new shelves are added to the frame in the same direction as the frame growth, while opposite indicates adding new shelves in the direction opposite to frame growth.

Vertical trough fields include VLE, VLO, both and none. VLE stands for vertical left even and indicates the vertical trough is on the left side of the even number verticals. VLO stands for vertical left odd and indicates the vertical trough is on the left side of the odd number verticals. Both indicates that a trough used as a pathway for jumper wires is present on both the left and right sides of the vertical. If none are selected, that indicates that there is no vertical trough on the frame used as a pathway for jumper wires.

The properties fields include the following fields. Intra-ties indicates whether cable ties are allowed within the same frame. Ties exist indicates that there are tie cables on the specified frame. Assign ties indicates that tie cable pairs need to be automatically assigned to the frame. H top trough indicates whether the frame has a top horizontal trough used as a pathway for jumper wires. H bottom trough indicates whether the frame has a bottom horizontal trough used as a pathway for jumper wires. JmprX M-shelf indicates whether jumpers cross in the middle of the module. Grandfathered indicates whether no frame assignments are permitted.

The function button reset restores fields to their default values. Function button OK executes a specific task, (e.g., add or modify data, initiate a search) closes the window, and returns you to the previous window. The function button cancel closes the window without saving data.

Figure 11:
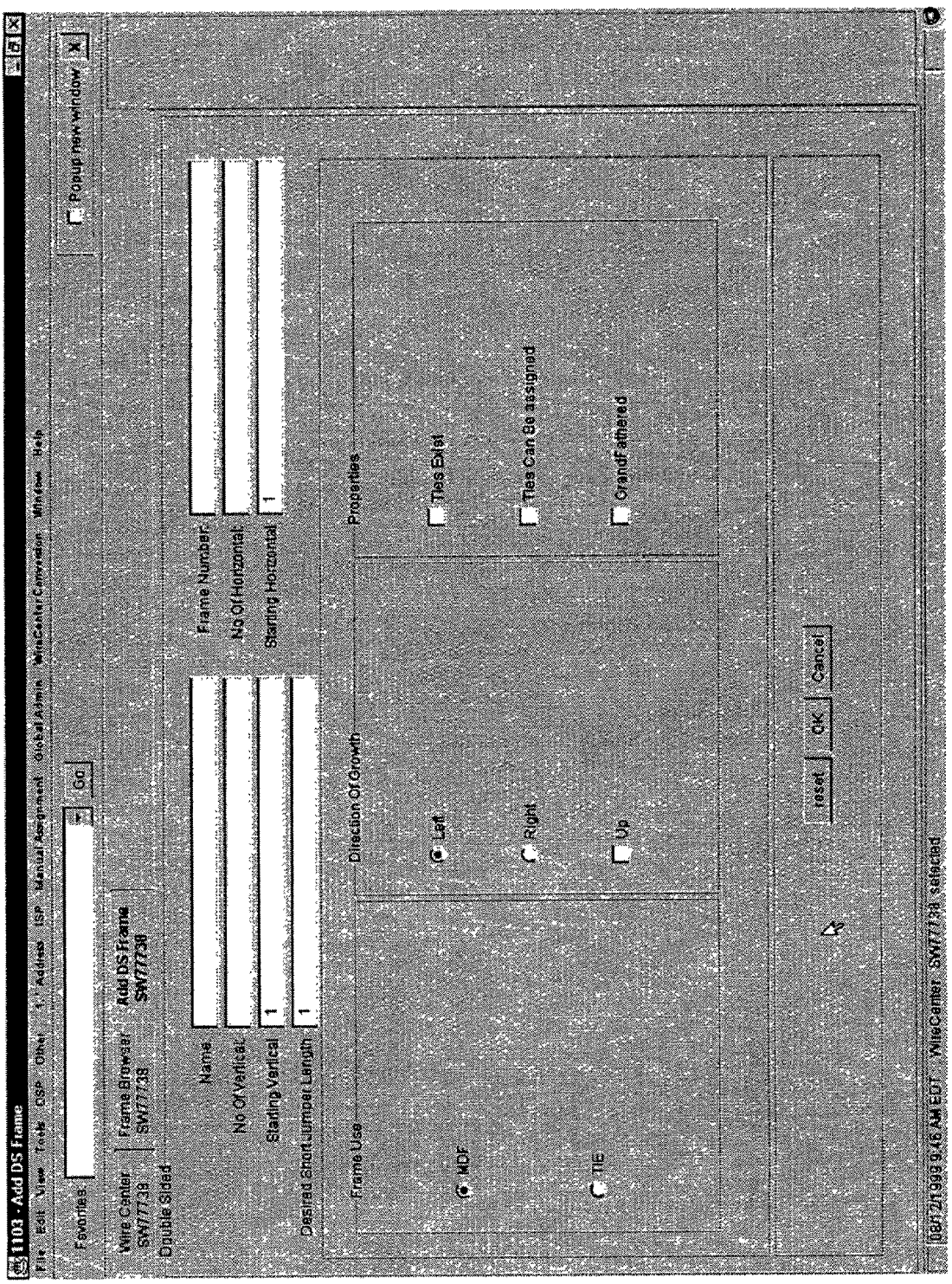
FIG. 11 shows an add double-sided frame window of the frame browser, in accordance with a preferred embodiment of the present invention.

FIG. 11 shows an exemplary screen add double-sided frame (add DS frame). The add DS frame window lets the user add a double-sided frame to the selected wire center location. It also lets the user set the number of verticals and horizontals on the frame, the direction of growth, the use of the frame, and the number of verticals a short jumper can span. The user also can specify whether tie cables are present and available to be assigned.

The add DS frame window preferably appears in response to a menu or radio button selection in the frame browser window of the present invention.

Tables 4 and 5 list and describe the fields and functions available in add DS frame:

TABLE 4

| Field | Description |
| --- | --- |
| Name | The descriptive name of the selected frame (e.g., Jackson Spring RSU). |
| Frame Number | The number assigned to the frame. |
| No of Vertical | The number of the added or modified vertical. |
| No of Horizontal | The number of shelves on the frame. |
| Starting Vertical | The number identifying the first vertical in the frame. |
| Starting Horizontal | The number identifying the first horizontal in the frame. |
| Desired Short Jumper Length | The number of frame verticals that can be spanned by a jumper connecting the outside plant facilities to the LNI. |
| Frame Use | |
| MDF | Indicates whether the specified frame is a main distribution frame (MDF). |
| TIE | The primary use of the frame is as a tie frame, as opposed to a main distribution frame. |
| Direction of Growth | |
| Left | Indicates the direction of growth for a frame. If selected, frame growth will be to the left. |
| Right | Indicates the direction of Growth for a frame. If selected, frame growth will be to the right. |
| Up | Indicates the direction of growth for the frame is upward. |
| Properties | |
| Ties Exist | Indicates that there are tie cables on the specified frame. |
| Ties Can Be Assigned | Indicates that tie cables can be assigned to the future. |
| Grandfathered | Indicates whether no frame assignments are permitted. |

TABLE 5

| Function | Description |
| --- | --- |
| Reset | Clear all data fields. |
| OK | Save data entries to the AAIS database. |
| Cancel | Close window without saving data field entries. |

The field name is the descriptive name of the selected frame (e.g., Jackson Spring RSU). Frame number is the number assigned to the frame. No of vertical is the number of the added or modified vertical. No of horizontal is the number of shelves on the frame. Starting vertical is the number identifying the first vertical in the frame. Starting horizontal is the number identifying the first horizontal in the frame. Desired short jumper length is the number of frame verticals that can be spanned by a jumper connecting the outside plant facilities to the LNI.

Frame use fields include MDF and TIE. MDF indicates whether the specified frame is a main distribution frame (MDF). TIE indicates that the primary use of the frame is as a tie frame, as opposed to a main distribution frame.

Direction of growth fields include left, right and up. Left indicates the direction of growth for a frame. If selected, frame growth will be to the left. Right indicates the direction of growth for a frame. If selected, frame growth will be to the right. Up indicates the direction of growth for the frame is upward.

Properties fields include ties exist, ties can be assigned and grandfathered. Ties exist indicates that there are tie cables on the specified frame. Ties can be assigned indicates that tie cables can be assigned in the future. Grandfathered indicates whether no frame assignments are permitted.

Function button reset clears all data fields, OK saves data entries to a database, and cancel closes the window without saving data field entries.

Figure 12:
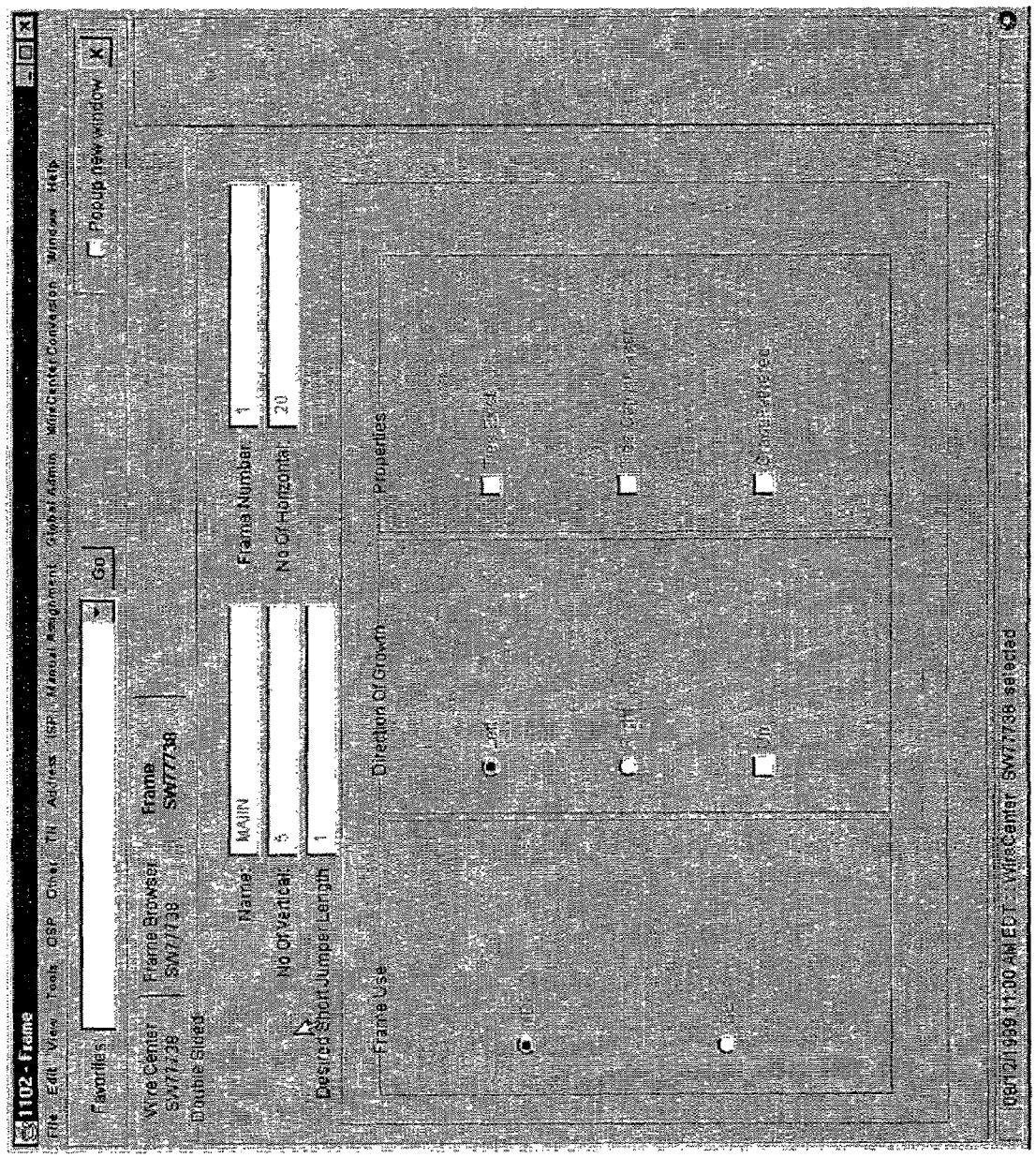
FIG. 12 shows a frame window, which allows the user to view the attributes of a specified frame, in accordance with a preferred embodiment of the present invention.

FIG. 12 shows an exemplary frame window, which allows the user to view the attributes of a specific frame. Table 6 shows the fields available in the frame window:

TABLE 6

| Field | Description |
| --- | --- |
| Name | The descriptive name of the selected frame (e.g., Jackson Spring RSU). |
| Frame Number | The number assigned to the frame. |
| No of Vertical | The number of the added or modified vertical. |
| No of Horizontal | The number of shelves on the frame. |
| Desired Short Jumper Length | The number of frame verticals that can be spanned by a jumper connecting the outside plant facilities to the LNI. |
| Frame Use | |
| MDF | Indicates whether the specified frame is a main distribution frame (MDF). |
| TIE | The primary use of the frame is as a tie frame, as opposed to a main distribution frame. |
| Direction of growth | |
| Left | Indicates the direction of growth for a frame. If selected, frame growth will be to the left. |
| Right | Indicates the direction of growth for a frame. If selected, frame growth will be to the right. |
| Up | Indicates the direction of growth for the frame is upward. |
| Properties | |
| Ties Exist | Indicates that there are tie cables on the specified frame. |
| Ties Can Be Assigned | Indicates that tie cable pairs need to be automatically assigned to the frame. |
| Grandfathered | Indicates whether no frame assignments are permitted. |

As shown in the table, the name field is the descriptive name of the selected frame (e.g., Jackson Spring RSU). Frame number is the number assigned to the frame. No of vertical is the number of the added or modified vertical. No of horizontal is the number of shelves on the frame. Desired short jumper length is the number of frame verticals that can be spanned by a jumper connecting the outside plant facilities to the LNI.

Frame use fields include MDF and TIE. MDF indicates, if selected, that the specified frame is a main distribution frame (MDF). TIE indicates, if selected, that the primary use of the frame is as a tie frame, as opposed to a main distribution frame.

Direction of growth fields include left, right and up. Left indicates the direction of growth for a frame. If selected, frame growth will be to the left. Right indicates the direction of Growth for a frame. If selected, frame growth will be to the right. Up indicates the direction of growth for the frame is upward.

Properties fields include ties exist, ties can be assigned, grandfathered and shelf per module. Ties exist indicates, if selected, that there are tie cables on the specified frame. Ties can be assigned indicates, if selected, that tie cables can be assigned to the future. Grandfathered indicates whether no frame assignments are permitted.

Figure 13:
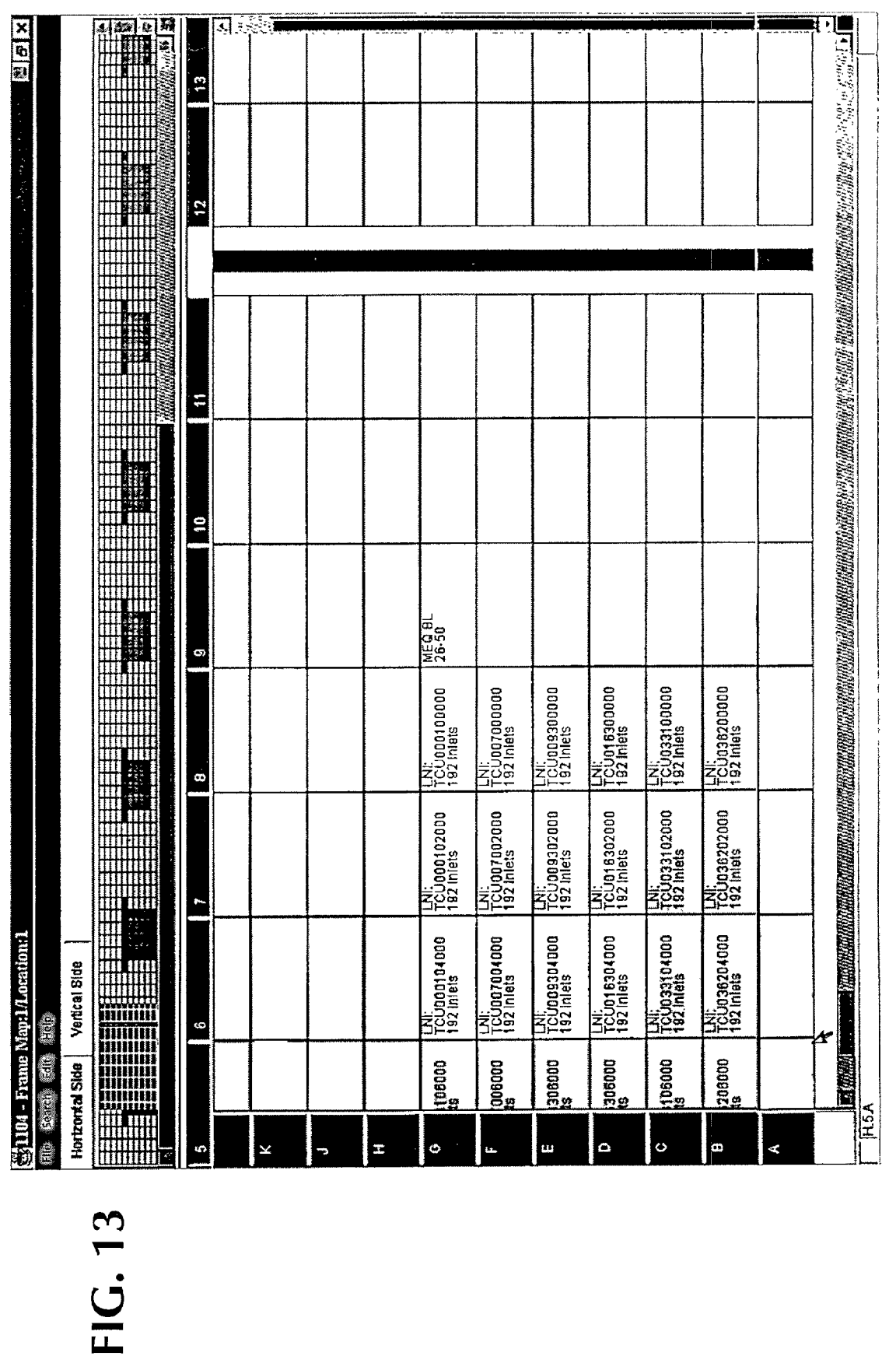

FIG. 13 shows an exemplary frame map window that allows a graphical representation of a specified frame to be viewed. Options from the menu bar in this window let you add and delete frame components and search for blocks containing equipment specified by the user. Note that in each displayed block, information for that block is displayed. Also, in the upper left hand corner of the window is a representation showing the overall frame layout and indicating in black which blocks are currently shown in the large display window.

Figure 14:
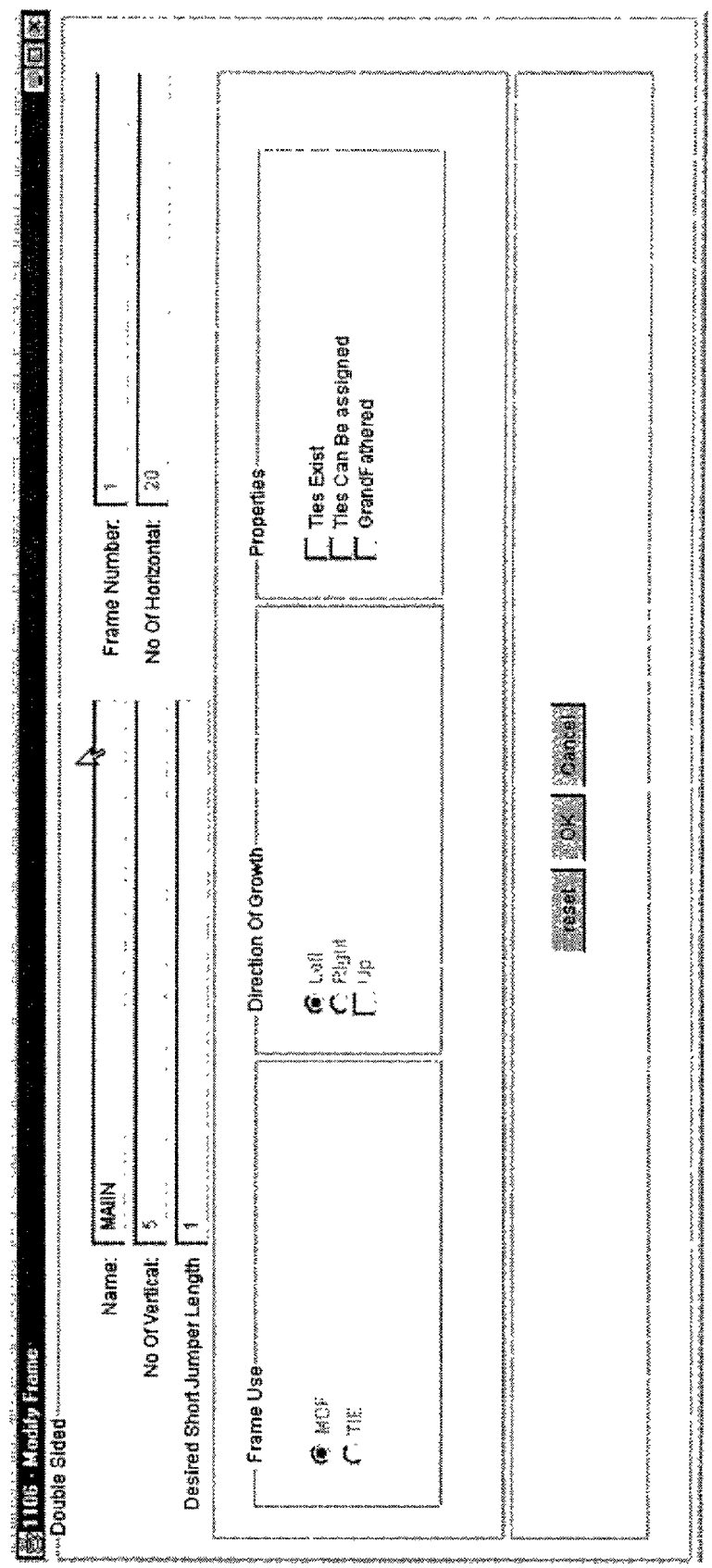
FIG. 14 shows a modify frame window, which allows a user to modify the attributes of a specified frame, in accordance with a preferred embodiment of the present invention.

FIG. 14 shows an exemplary modify frame window, which allows a user to modify the attributes of a specified frame. Two frame attributes, the number of verticals and the number of horizontals, are protected on this window and must be modified in the frame map window. The modify frame window is preferably presented in response to its selection from a menu bar in the frame map window. The fields and functions available in modify frame are listed below in Tables 7 and 8:

TABLE 7

| Field | Description |
| --- | --- |
| Name | The descriptive name of the selected frame (e.g., Jackson Spring RSU). |
| Frame Number | The number assigned to the frame. |
| No of Vertical | The number of the added or modified vertical. |
| No of Horizontal | The number of shelves on the frame. |
| Desired Short Jumper Length | The number of frame verticals that can be spanned by a jumper connecting the outside plant facilities to the LNI. |
| Frame Use | |
| MDF | Indicates whether the specified frame is a main distribution frame (MDF). |
| TIE | The primary use of the frame is as a tie frame, as opposed to a main distribution frame. |
| Direction of growth | |
| Left | Indicates the direction of growth for a frame. If selected, frame growth will be to the left. |
| Right | Indicates the direction of growth for a frame. If selected, frame growth will be to the right. |
| Up | Indicates the direction of growth for the frame is upward. |
| Properties | |
| Ties Exist | Indicates that there are tie cables on the specified frame. |
| Ties Can Be Assigned | Indicates that tie cable pairs need to be automatically assigned to the frame. |
| Grandfathered | Indicates whether no frame assignments are permitted. |

TABLE 8

| Function | Description |
| --- | --- |
| Reset | Clear all data fields. |
| OK | Save data to AAIS database and return to previous window. |
| Cancel | Close window without changing records. |

As shown in the tables, the name field is the descriptive name of the selected frame (e.g., Jackson Spring RSU). Frame number is the number assigned to the frame. No of vertical is the number of the added or modified vertical. No of horizontal is the number of shelves on the frame. Desired short jumper length is the number of frame verticals that can be spanned by a jumper connecting the outside plant facilities to the LNI.

Frame Use fields include MDF and TIE. MDF indicates, if selected, that the specified frame is a main distribution frame (MDF). TIE indicates, if selected, that the primary use of the frame is as a tie frame, as opposed to a main distribution frame.

Direction of growth fields include left, right and up. Left indicates the direction of growth for a frame. If selected, frame growth will be to the left. Right indicates the direction of growth for a frame. If selected, frame growth will be to the right. Up indicates the direction of growth for the frame is upward.

Properties fields include ties exist, ties can be assigned, grandfathered and shelf per module. Ties exist indicates that there are tie cables on the specified frame. Ties can be assigned indicates that tie cables can be assigned to the future.

Grandfathered indicates whether no frame assignments are permitted.

The reset function button clears all data fields. The OK function button saves data to the database and returns to the previous window. Cancel closes the window without changing records.

Figure 15:
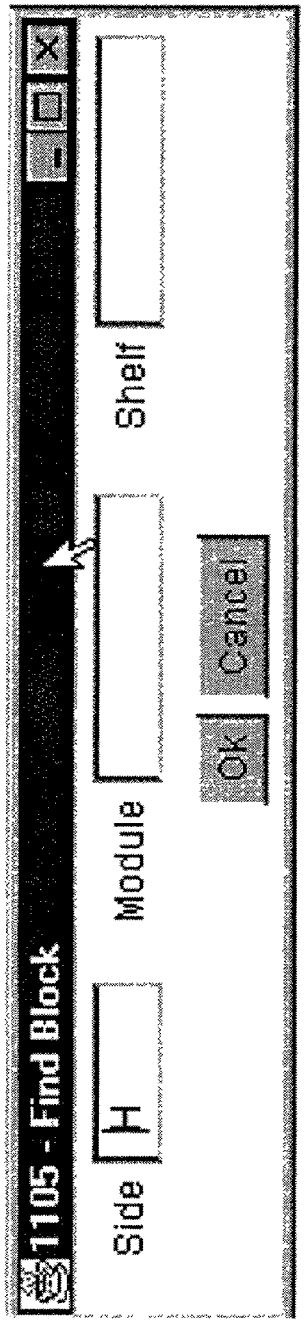
FIG. 15 shows a find block window, which allows the user to enter the coordinates of a block and display the block on the graphical representation of the frame in the frame map window, in accordance with a preferred embodiment of the present invention.

FIG. 15 shows an exemplary find block window, which allows the user to enter the coordinates of a block and display the block on the graphical representation of the frame in the frame map window. The find block window is preferably accessible from a menu bar in the frame map window, under a search heading.

The following fields and functions are available in find block:

TABLE 9

| Field | Description |
| --- | --- |
| Side | The side of the frame on double-sided frames. |
| Module | The number of the module you are searching for. |
| Shelf | The shelf on the frame where you want to search for a block. |

TABLE 10

| Function | Description |
| --- | --- |
| OK | Executes a specific task (e.g., add or modify data, initiate a search), closes the window, and returns you to the previous window. |
| Cancel | Closes the window without saving data. |

The field side indicates the side of the frame in double-sided frames. Module is the number of the module being searched for. Shelf is the shelf on the frame where the user wishes to search for the block. Function button OK executes a specific task (e.g., add or modify data, initiate a search), closes the window, and returns the user to the previous window. Function button cancel closes the window without saving data.

Figure 16:
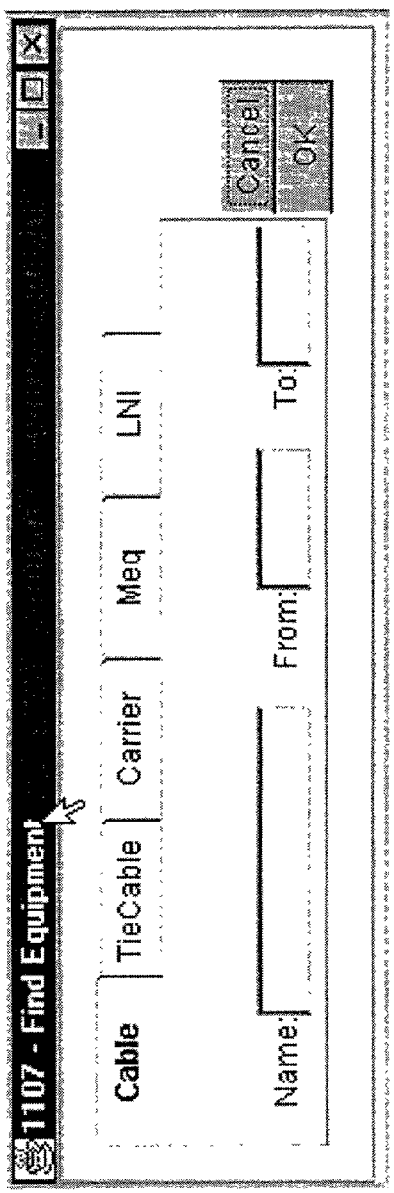
FIG. 16 shows a find equipment window, in accordance with a preferred embodiment of the present invention.

FIG. 16 shows an exemplary find equipment window. The find equipment window allows a user to enter equipment information and display the block containing that equipment on the graphical representation of the frame in the frame map window. The find equipment window is preferably accessible from a menu bar of the frame map window, under the search sub-heading.

The following fields and functions are available in the find equipment window:

TABLE 11

| Field | Description |
| --- | --- |
| Cable tab | |
| Name | The name or other identifier of the cable, tie cable, carrier, MEQ, or LNI you are searching for. |
| From [with Name] | The first identifier in a range of identifiers used to limit a search. |
| To | The ending number in a range of numbers. This number is used to limit the search. |
| Tie Cable tab | |
| Name | The name or other identifier of the cable, tie cable, carrier, MEQ, or LNI you are searching for. |
| From [with Name] | The first identifier in a range of identifiers used to limit a search. |
| To | The ending number in a range of numbers. This number is used to limit the search. |
| Carrier tab | |
| Name | The name or other identifier of the cable, tie cable, carrier, MEQ, or LNI you are searching for. |
| Start SysNo | The first number in a range of system numbers used to limit a search. |
| Start ChNo | The first number in a range of channel numbers used to limit a search. |
| End SysNo | The last number in a range of system numbers used in a search. |
| End ChNo | The last number in a range of channel numbers used in a search. |
| MEQ tab | |
| Name | The name or other identifier of the cable, tie cable, carrier, MEQ, or LNI you are searching for. |
| From [with Name] | The first identifier in a range of identifiers used to limit a search. |
| To | The ending number in a range of numbers. This number is used to limit the search. |
| LNI tab | |
| Name | The name or other identifier of the cable, tie cable, carrier, MEQ, or LNI you are searching for. |
| Switch | Determines the switch numbers for the line equipment search, i.e., 1–4. |
| Inlets | The number that identifies the port on the line card. |

TABLE 12

| Function | Description |
| --- | --- |
| Cable tab | |
| Cancel | Closes the window without saving data. |
| OK | Executes a specific task (e.g., add or modify data, initiate a search), closes the window, and returns you to the previous window. |
| Tie Cable tab | |
| Cancel | Closes the window without saving data. |
| OK | Executes a specific task (e.g., add or modify data, initiate a search), closes the window, and returns you to the previous window. |
| Carrier tab | |
| Cancel | Closes the window without saving data. |
| OK | Executes a specific task (e.g., add or modify data, initiate a search), closes the window, and returns you to the previous window. |
| MEQ tab | |
| Cancel | Closes the window without saving data. |
| OK | Executes a specific task (e.g., add or modify data, initiate a search), closes the window, and returns you to the previous window. |
| LNI tab | |
| Cancel | Closes the window without saving data. |
| OK | Executes a specific task (e.g., add or modify data, initiate a search), closes the window, and returns you to the previous window. |

The cable tab fields, which are not visible in the figure, are name, from [with name], and to. Name is the name or other identifier of the cable, tie cable, carrier, MEQ, or LNI being searched for. From [with name] is the first identifier in a range of identifiers used to limit a search. To is the ending number in a range of numbers. This number is used to limit the search.

The tie cable tab fields are not visible in the figure but also are designated name, from [with name], and to and, as is shown in the table, have the same functions as the cable tab fields.

The carrier tab fields, which are not visible in the figure, are next described. The name field has the name or other identifier of the cable, tie cable, carrier, MEQ, or LNI being searched for. Start SysNo is the first number in a range of system numbers used to limit a search. Start ChNo is the first number in a range of channel numbers used to limit a search. End SysNo is the last number in a range of system numbers used in a search. End ChNo is the last number in a range of channel numbers used in a search.

MEQ tab fields, not visible in the figure, also are designated name, from [with name], and to and, as is shown in the table, have the same functions as the cable tab fields.

LNI tab fields are name, switch and inlets. Name is the name or other identifier of the cable, tie cable, carrier, MEQ, or LNI being searched for. Switch determines the switch numbers for the line equipment search, i.e., 1–4. Inlets is the number that identifies the port on the line card.

The functions associated with the find equipment window are next described.

The cable tab function buttons for all of the tabs are cancel and OK. Cancel closes the window without saving data. OK executes a specific task (e.g., add or modify data, initiate a search), closes the window, and returns you to the previous window. Tie cable tab function buttons, carrier tab function buttons, MEQ tab function buttons and LNI tab function buttons, are the same as the cable tab function buttons, that is, cancel and OK.

Figure 17:
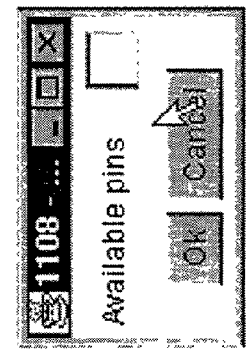
FIG. 17 shows an available pins window, in accordance with a preferred embodiment of the present invention.

FIG. 17 shows an exemplary available pins window. The available pins window allows a user to search the frame map for a block with a specified number of available pins. Search results are shown as highlighted blocks on the map of the frame in the upper left corner of the frame map window. Preferably, the available pins window is accessible from a menu bar in the frame map window, through sub-headings search, and highlight available blocks.

The following tables describe the fields and functions available in the available pins window:

TABLE 13

| Field | Description |
| --- | --- |
| Available Pins | The number of available pins used in a search of the blocks on the frame. |

TABLE 14

| Function | Description |
| --- | --- |
| OK | Executes a specific task (e.g., add or modify data, initiate a search), closes the window, and returns you to the previous window. |
| Cancel | Closes the window without saving data. |

The available pins field is the number of available pins used in a search of the blocks on the frame. Function buttons available are OK and cancel, with have the same descriptions as given above.

As can be appreciated from the above description, the GUI of the present invention allows a user to visualize easily the characteristics of frames throughout a telco's service area. By virtue of those features, a user can remotely control the maintenance and growth of subscriber service by monitoring and controlling connection to the frames.

While the above exemplary embodiment has been described in terms of a preferred implementation of the present invention, the invention is not limited to the preferred embodiment and other variations and modifications of the invention and its various aspects will become apparent, after having read this disclosure, to those skilled in the art, all such variations and modifications being contemplated as falling within the scope of the invention, which is defined by the appended claims.

What is claimed:

1. A method of presenting to a user a visual representation of a frame laid out in a matrix of blocks, each block laid out in a matrix of pins, the frame resident at a central office of a telecommunications system, the method comprising:
    maintaining in a database data describing the frame, including (a) data uniquely identifying blocks in the frame, and (b) data describing a current condition of the frame, including data indicating which pins in the frame are currently in use and which pins in the frame are currently available for use wherein the database identifies blocks in the frame using a triple for each identified block, the triple indicating for each identified block a module, a shelf within the module and a block within the shelf in a case where the frame is a single-sided frame and a side, a vertical coordinate and a horizontal coordinate in a case where the frame is a double-sided frame;

accessing the database to determine a current condition of the frame;

displaying, based on the accessed data, a graphical representation of the frame, the graphical representation including a visual indication of the current condition of the frame including a visual indication of a plurality of pins currently in use and a visual indication of a plurality of pins available for use; and allowing a user to interface with the graphical representation to effect a mapping between available pins on the frame and telecommunications lines leading to and from the frame.

2. A method according to claim 1, wherein the displaying step displays the graphical representation of the frame in response to the user specifying a particular frame from a particular central office in the telecommunications system.

3. A method according to claim 2, wherein the frame is made up of constituent blocks and the displaying step may display a particular block from a specified frame in response to the user's entry of coordinates for the block.

4. A method according to claim 1, wherein the allowing step further allows the user to modify attributes of the selected frame.

5. A method according to claim 1, wherein the graphical representation of the frame displayed at the displaying step includes a first Web page showing a frame of a selected central office laid out as a matrix of constituent blocks.

6. A method according to claim 5, wherein the graphical representation of the frame displayed at the displaying step includes a second Web page showing available pins on any block in the matrix, and allows the user to search for a block having a number of available pins entered by the user.

7. A method according to claim 6, wherein the allowing step allows the user to assign a jumper from a port on a switching card to an available pin.

8. A method according to claim 6, wherein the allowing step allows the user to assign a jumper from an available pin to an outside plant feeder.

9. A method according to claim 1, further comprising the step of allowing the user to add a new frame at a selected central office of the telecommunications system.

10. A method according to claim 9, wherein the user can specify a number of modules, shelves, and blocks per shelf for an added new frame.

11. A program storage device having computer-readable code embedded therein for a host computer on a network, the host computer being operable to communicate with a client computer on the network and having access to a database of information relating to one or more frames laid out in a matrix of blocks, each block laid out in a matrix of pins, the one or more frames located at telecommunications system central offices, the code comprising:

code for processing requests from the client computer for data relating to one or more frames;

code for initiating database interface code, the database interface code retrieving the requested data from the database, the database maintaining data describing one or more frames, including (a) data uniquely identifying blocks in the one or more frames, and (b) data describing a current condition of the one or more frames, including data indicating which pins in the one or more frames are currently in use and which pins in the one of more frames are currently available for use, wherein the database identifies blocks in the one or more frames using a triple for each identified block, the triple indicating for each identified block a module, a shelf within the module and a block within the shelf in a case where the frame is a single-sided frame and a side, a vertical coordinate and a horizontal coordinate in a ease where the frame is a double-sided frame;

code for formatting a graphical representation of a current condition of the one or more frames in the request, the graphical representation including a visual indication of a plurality of pins currently in use and a visual indication of a plurality of pins available for use; and code for communicating the formatted graphical representation of the one or more frames to the client computer and for allowing a user of the client computer to interface with the graphical representation to effect a mapping between available pins on the one or more frames and telecommunications lines leading to and from the one or more frames.

12. A program storage device according to claim 11, wherein the code further comprises the database interface code, and the database interface code comprises a common gateway interface (CGI) application.

13. A program storage device according to claim 11, wherein the code further comprises the database interface code, and the database interface code comprises a Java servlet.

14. A program storage device according to claim 11, wherein the graphical representation of the frame is generated in response to the user specifying a particular frame from a particular central office in the telecommunications system.

15. A program storage device according to claim 14, wherein the frame is made up of constituent blocks and the graphical representation of the frame may show a particular block from a specified frame in response to the user's entry of coordinates for the block.

16. A program storage device according to claim 11, wherein the code for communicating further allows the user to modify attributes of the selected frame.

17. A program storage device according to claim 11, wherein the graphical representation of the frame includes a first Web page showing a frame of a selected central office laid out as a matrix of constituent blocks.

18. A program storage device according to claim 17, wherein the graphical representation of the frame includes a second Web page showing available pins on any block in the matrix, and allowing the user to search for a block having a number of available pins entered by the user.

19. A program storage device according to claim 18, wherein the code for communicating allows the user to assign a jumper from a port on a switching card to an available pin.

20. A program storage device according to claim 18, wherein the code for communicating allows the user to assign a jumper from an available pin to an outside plant feeder.

21. A program storage device according to claim 11, further comprising code for allowing the user to add a new frame at a selected central office of the telecommunications system.

22. A program storage device according to claim 21, wherein the user can specify a number of modules, shelves, and blocks per shelf for an added new frame.

23. A server computer on a network, the server computer having access to a database of information relating to one or more frames laid out in a matrix of blocks, each block laid out in a matrix of pins, the one or more frames located at telecommunications central offices, the server computer being operable to:

communicate with a client computer on the network;

process requests from the client computer for data relating to one or more frames including data indicating which pins in the one or more frames are currently in use and which pins in the one or more frames are available for use;

initiate database interface code, the database interface code retrieving the requested data from the database, the database maintaining data describing the one or more frames, including (a) data uniquely identifying blocks in the one or more frames and (b) data describing a current condition of the one or more frames, including data indicating which pins in the one or more frames are currently in use and which pins in the one or more frames are currently available for use wherein the database identifies blocks in the one or more frames using a triple for each identified block, the triple indicating for each identified block a module, a shelf within the module and a block within the shelf in a case where the frame is a single-sided frame and a side, a vertical coordinate and a horizontal coordinate in a case where the frame is a double-sided frame;

format a graphical representation of a current condition of the one or more frames in the request, the graphical representation including a visual indication of a plurality of pins currently in use and a visual indication of a plurality of pins available for use; and communicate the formatted graphical representation of the one or more frames to the client computer and allow a user of the client computer to interface with the graphical representation to effect a mapping between available pins on the one or more frames and telecommunications lines leading to and from the one or more frames.

24. A server according to claim 23, wherein the database interface code comprises a common gateway interface (CGI) application.

25. A server according to claim 23, wherein the database interface code comprises a Java servlet.

26. A server according to claim 23, wherein the graphical representation of the frame is generated in response to the user specifying a particular frame from a particular central office in the telecommunications system.

27. A server according to claim 26, wherein the frame is made up of constituent blocks and the graphical representation of the frame shows a particular block from a specified frame in response to the user's entry of coordinates for the block.

28. A server according to claim 23, wherein the server is further operable to allow the user to modify attributes of the selected frame.

29. A server according to claim 23, wherein the graphical representation of the frame includes a first Web page showing a frame of a selected central office laid out as a matrix of constituent blocks.

30. A server according to claim 29, wherein the graphical representation of the frame includes a second Web page showing available pins on any block in the matrix, and allowing the user to search for a block having a number of available pins entered by the user.

31. A server according to claim 30, wherein the server is operable to allow the user to assign a jumper from a port on a switching card to an available pin.

32. A server according to claim 30, wherein the server is operable to allow the user to assign a jumper from an available pin to an outside plant feeder.

33. A server according to claim 23, the server further being operable to allow the user to add a new frame at a selected central office of the telecommunications system.

34. A server according to claim 33, wherein the user can specify a number of modules, shelves, and blocks per shelf for an added new frame.

35. A program storage device having embedded therein computer code for a client computer on a network, the code comprising:

code for communicating with a server on the network, the server having access to a database of information relating to one or more frames located at telecommunications central offices, each frame laid out in a matrix of blocks, each block laid out in a matrix of pins, the database maintaining data describing the one or more frames, including (a) data uniquely identifying blocks in the one or more frames, and (b) data describing a current condition of the one or more frames, including data indicating which pins in the one or more frames are currently in use and which pins in the one or more frames are available for use wherein the database identifies blocks in the one or more frames using a triple for each identified block, the triple indicating for each identified block a module, a shelf within the module and a block within the shelf in a case where the frame is a single-sided frame and a side, a vertical coordinate and a horizontal coordinate in a case where the frame is a double-sided frame;

code for sending requests to the server for information relating to one or more frames, the requests causing the server to initiate execution of database interface code, the database interface code retrieving the requested data from the database and formatting a graphical representation of a current condition of the one or more frames in the request, the graphical representation including a visual indication of a plurality of pins currently in use and a plurality of pins available for use;

code for receiving the formatted graphical representation of the one or more frames from the server, the received graphical representation allowing a user of the client computer to interface with the graphical representation to effect a mapping between available pins on the one or more frames and telecommunications lines leading to and from the one or more frames.

36. A program storage device according to claim 35, wherein the graphical representation of the frame includes a first Web page showing a frame of a selected central office laid out as a matrix of constituent blocks.

37. A program storage device according to claim 36, wherein the graphical representation of the frame includes a second Web page showing available pins on any block in the matrix, and allowing the user to search for a block having a number of available pins entered by the user.

38. A program storage device according to claim 37, wherein the received graphical representation allows the user to assign a jumper from a port on a switching card to an available pin.

39. A program storage device according to claim 37, wherein the received graphical representation allows the user to assign a jumper from an available pin to an outside plant feeder.

40. A program storage device according to claim 35, wherein the received graphical representation allows the user to add a new frame at a selected central office of the telecommunications system.

41. A program storage device according to claim 40, wherein the user can specify a number of modules, shelves, and blocks per shelf for an added new frame.

42. An apparatus for presenting to a user a visual representation of a frame laid out in a matrix of blocks, each block laid out in a matrix of pins, the frame resident at a central office of a telecommunications system, the apparatus comprising:

means for accessing a database maintaining data describing the frame, including (a) data uniquely identifying blocks in the frame, and (b) data describing a current condition of the frame, including data indicating which pins in the frame are currently in use and which pins in the frame are available for use wherein the database identifies blocks in the frame using a triple for each identified block, the triple indicating for each identified block a module, a shelf within the module and a block within the shelf in a case where the frame is a single-sided frame and a side, a vertical coordinate and a horizontal coordinate in a case where the frame is a double sided-frame;

means for displaying, based on the accessed data, a graphical representation of the frame, the graphical representation including a visual indication of the current condition of the frame including a visual indication of a plurality of pins currently in use and a visual indication of a plurality of pins available for use; and means for allowing a user to interface with the graphical representation to effect a mapping between available pins on the frame and telecommunications lines leading to and from the frame.

43. An apparatus according to claim 42, wherein the displaying step displays the graphical representation of the frame in response to the user specifying a particular frame from a particular central office in the telecommunications system.

44. An apparatus according to claim 43, wherein the frame is made up of constituent blocks and the means for displaying may display a particular block from a specified frame in response to the user's entry of coordinates for the block.

45. An apparatus according to claim 42, wherein the means for allowing is further operable to allow the user to modify attributes of the selected frame.

46. An apparatus according to claim 42, wherein the graphical representation of the frame displayed by the means for displaying includes a first Web page showing a frame of a selected central office laid out as a matrix of constituent blocks.

47. An apparatus according to claim 46, wherein the graphical representation of the frame displayed by the means for displaying includes a second Web page showing available pins on any block in the matrix, and allows the user to search for a block having a number of available pins entered by the user.

48. An apparatus according to claim 47, wherein the means for allowing allows the user to assign a jumper from a port on a switching card to an available pin.

49. An apparatus according to claim 47, wherein the means for allowing allows the user to assign a jumper from an available pin to an outside plant feeder.

50. An apparatus according to claim 42, further comprising means for allowing the user to add a new frame at a selected central office of the telecommunications system.

51. An apparatus according to claim 50, wherein the user can specify a number of modules, shelves, and blocks per shelf for an added new frame.

* * * * *